Sept. 29, 1942. T. M. VAUGHAN 2,297,333
SHIPPING CRATE
Filed June 1, 1940 3 Sheets-Sheet 1
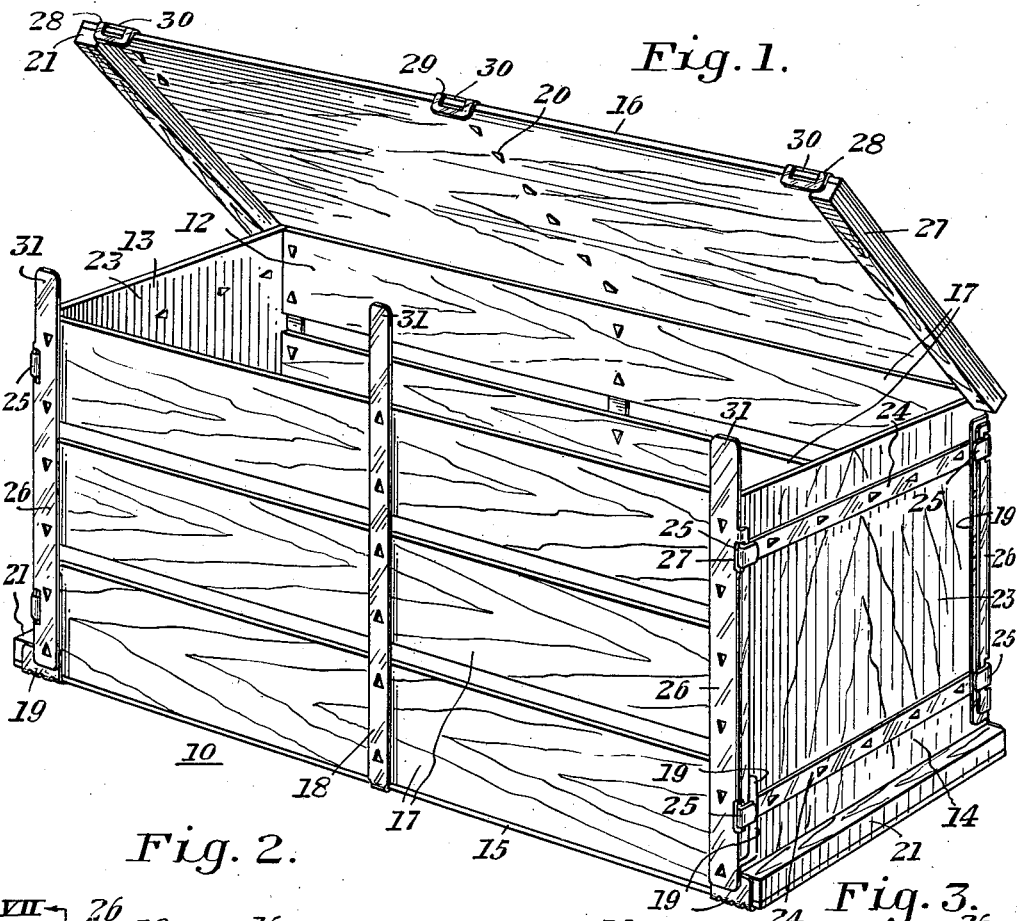
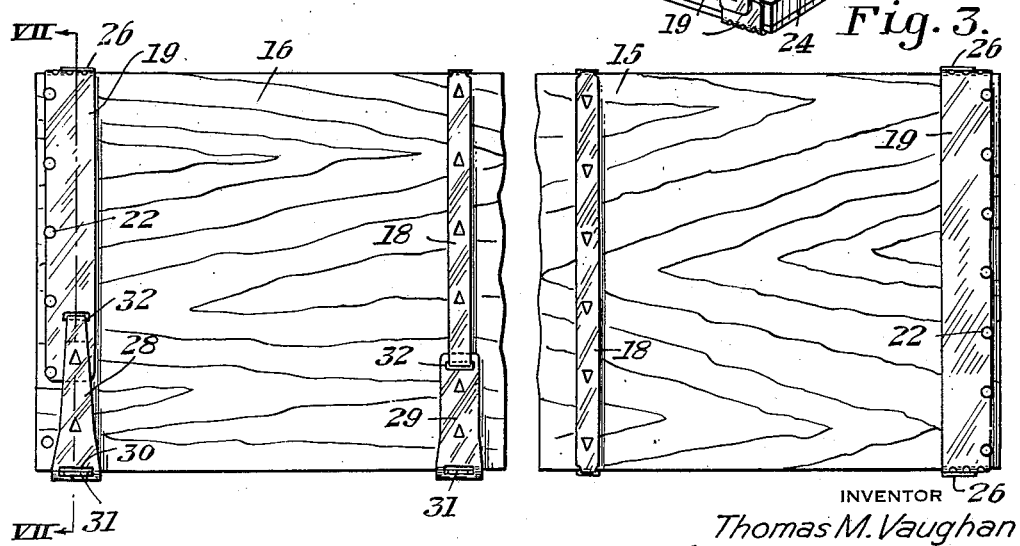
INVENTOR
Thomas M. Vaughan
by his attorneys
Stebbins and Blenko

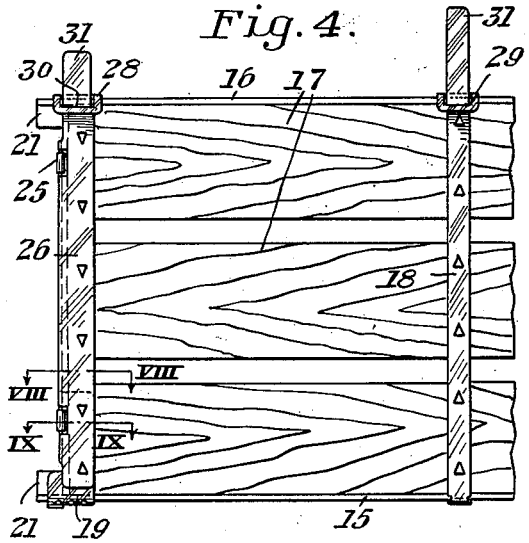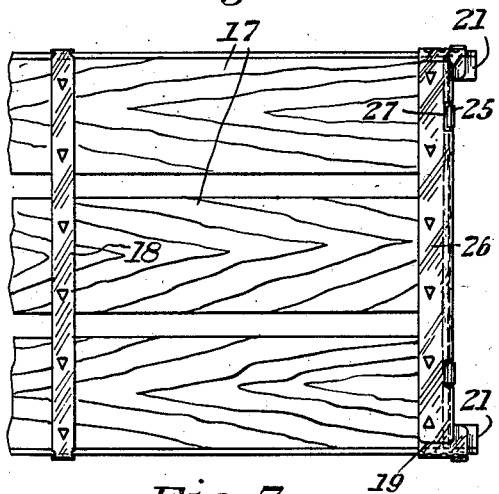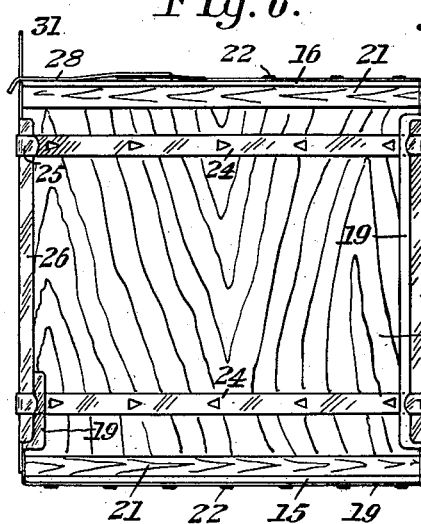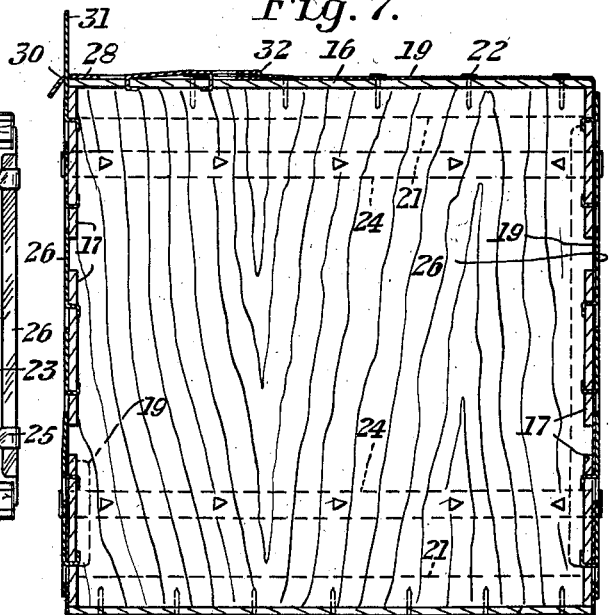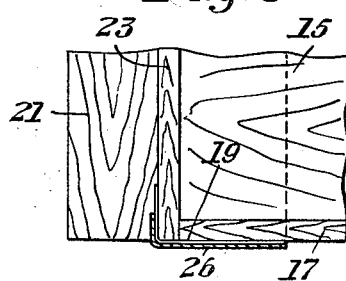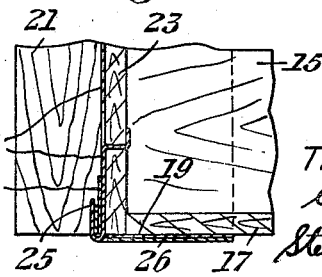

Sept. 29, 1942. T. M. VAUGHAN 2,297,333
SHIPPING CRATE
Filed June 1, 1940 3 Sheets-Sheet 3
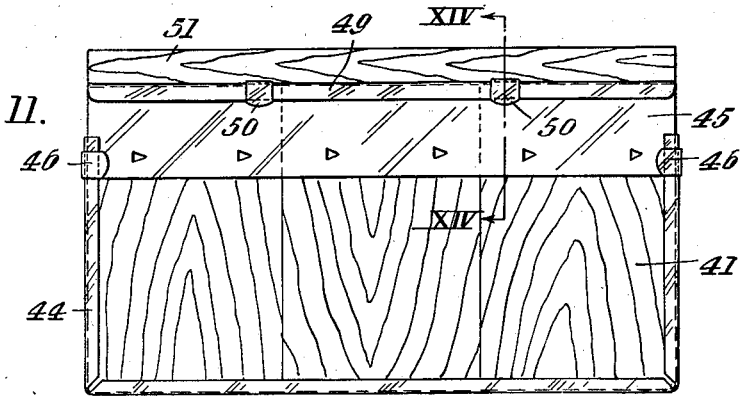
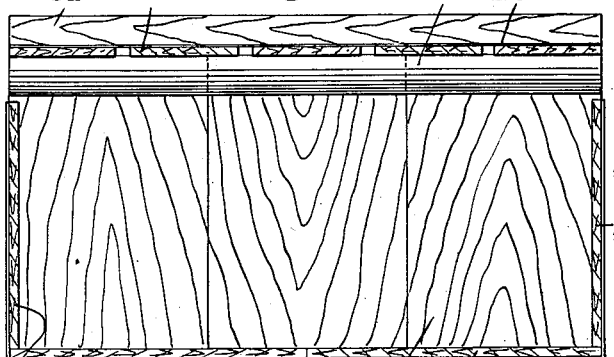
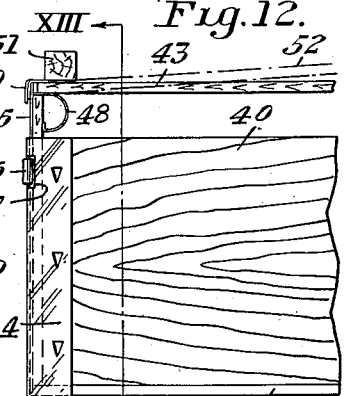
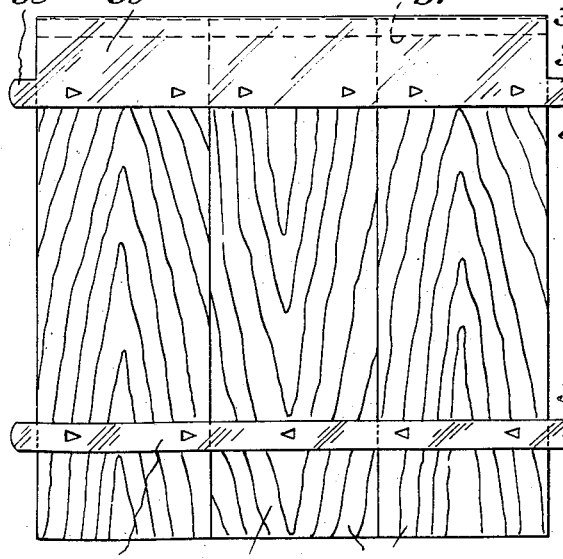
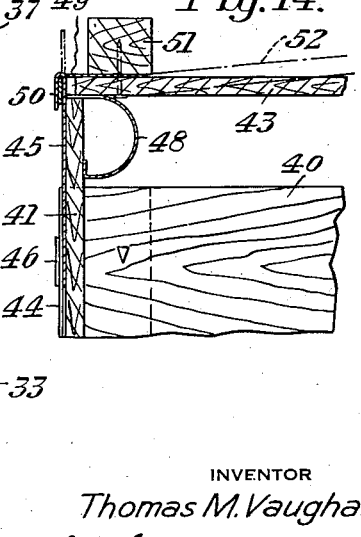
INVENTOR
Thomas M. Vaughan
by his attorneys
Stebbins and Blenko Patented Sept. 29, 1942

2,297,333

UNITED STATES PATENT OFFICE 2,297,333

SHIPPING CRATE

Thomas M. Vaughan, Tampa, Fla.

Application June 1, 1940, Serial No. 338,395

6 Claims. (Cl. 217—40)

This invention relates to a shipping crate and, in particular, to a crate suitable for use in the shipment of fruit, vegetables, and the like. In general, the present invention is an improvement on the crate described and claimed in my Patent 2,186,743.

The particular object of the present invention is to provide a crate which can be cheaply manufactured and which is characterized by sufficient rigidity to withstand handling. A further object is to provide a crate which may be conveniently handled and safely stacked.

In a preferred embodiment of the invention, I provide a crate having side and end panels and a top and bottom with binding straps extending around the circumference of the crate adjacent the ends thereof, the end panels being interlocked with the binding straps. In one form of the invention, the end panels are provided with metal sheathing adjacent their upper edges which is bent over the latter and formed into an inwardly extending roll adapted to hold the top layer of the articles packed in the crate in proper position.

The details of my invention together with the novel features and advantages thereof will become apparent during the following description, with reference to the accompanying drawings illustrating several embodiments. In the drawings, Fig. 1 is a perspective view of a crate suitable for the shipment of citrus fruit showing the top open;

Fig. 2 is a partial plan view showing the top in closed position;

Fig. 3 is a partial bottom plan view;

Fig. 4 is a partial side elevation looking toward the front side;

Fig. 5 is a partial side elevation looking toward the rear side;

Fig. 6 is an end elevation;

Fig. 7 is a transverse sectional view taken along the line VII—VII of Fig. 2;

Fig. 8 is a partial section along the line VIII—VIII of Fig. 4;

Fig. 9 is a partial section along the line IX—IX of Fig. 4;

Fig. 10 is an elevation of a modified end panel;

Fig. 10A is an edge view thereof;

Fig. 11 is an end elevation of a modified crate;

Fig. 12 is a partial side elevation;

Fig. 13 is a transverse section along the line XIII—XIII of Fig. 12; and

Fig. 14 is a partial section along the line XIV—XIV of Fig. 11.

Referring now in detail to the drawings, and for the present to Figs. 1 through 9, a crate indicated generally at 10 comprises front and rear side panels 11 and 12, end panels 13 and 14, a bottom 15, and a top 16. The top and bottom may each be conveniently formed of a single thin piece of wood while the sides are preferably formed of a plurality of slats 17. A metal binding strap 18 extends around the crate substantially centrally thereof. Binding straps 19 extend around the greater portion of the circumference of the box adjacent the ends thereof. The strap 18 is relatively thin but is of sufficient thickness that tongues or tangs 20 struck outwardly therefrom may be driven through the top and bottom and the slats composing the side panels, and clinched. The straps 19 are composed of metal which is thinner than that from which the strap 18 is formed, and so thin that tongues struck outwardly therefrom could not be driven through the top, bottom or sides of the crate.

As shown in the drawings, the top 16 and the bottom 15 are longer than the sides 11 and 12. Cross rails 21 are nailed to the overhanging ends of the top and bottom and provide readily accessible gripping means, facilitating manual handling of the crate when packed and closed.

The straps 19 extend across the bottom of the crate adjacent the ends, as shown in Fig. 3. These straps extend upwardly a short distance along the front side 11, as shown in Fig. 1. The other ends of the straps extend up along the full height of the rear side 12 and over the greater portion of the top 16, as shown in Figs. 1 and 2. The straps 19 are secured to the bottom and top by nails 22 driven through the latter to hold the cross rails 21 thereon.

End panels 23 have cross straps 24 adjacent the upper and lower edges thereof composed of metal thicker than that of which the straps 19 are formed, i. e., thick enough so that tongues struck outwardly therefrom may be driven through the thin piece of wood forming the panels proper. The straps 24 have projecting ends 25.

Reinforcing straps 26 of angle section overlie the portions of the straps 19 which extend upwardly along the side panels. The straps 26 are composed of metal thick enough so that tongues struck therefrom may be driven through the slats of the side panels. The portions of the straps 19 which the straps 26 overlie have holes formed therein to admit the tongues formed on the reinforcing straps 26.

As shown in the drawings, the portions of the straps 19 secured to the bottom and top of the crate have their edges on opposite sides of the end panels 23. The overhanging edges of those portions of the straps 19 extending upwardly along the side panels are flanged over as shown in Fig. 1. These portions of the straps 19, furthermore, and the reinforcing straps 26, have slots 27 therein adapted to receive the projecting ends 25 of the cross straps 24 on the end panels 23.

Locking lugs 28 and 29 composed of metal thick enough so that tongues struck therefrom may be driven through the top of the crate are secured thereto adjacent the ends and middle thereof, respectively, as shown in Fig. 2. These lugs have slots 30 therein adapted to receive tongues 31 on the ends of the strap 18 and the reinforcing straps 26 on the front side of the crate. These tongues are bent down after the top has been closed and the tongues inserted through the slots 30, thus holding the top securely in closed position. The lugs 28 and 29 are interlocked with the straps 19 and 18, respectively, by slotting one member and bending over the end of the other as shown at 32 in Figs. 2 and 7.

It will be apparent from the foregoing description that the crate may conveniently be assembled by laying the pieces adapted to form the top, bottom and side panels on a flat surface and attaching to them the strap 18 and the straps 19. The cross rails 21 are nailed to the ends of the top and bottom simultaneously with the application of the straps 19 thereto. The reinforcing straps 26 may then be applied. Thereafter, the side panels and top may then be bent upwardly about the bottom, with the end panels disposed in such position that the projecting ends 25 of the cross straps 24 thereof will properly enter the slots 27. It will be understood that the straps 19 and 26 are so applied to the side panels that space is left between the ends of the latter and the flanges on the straps, to receive the side edges of the end panels. When the projecting ends 25 of the cross straps 24 have been inserted in the slots 27 and bent over, the crate is rigidly assembled and is ready to be filled and closed. Since the assembly of the crate is a relatively simple matter, crates according to the invention may conveniently be shipped in knocked-down form and assembled at the point of use by unskilled labor.

Fig. 10 illustrates a modified form of end panel 33. As shown, it comprises slats 34 secured together by a cross strap 35 similar to those shown at 23 and a wide strap or sheathing 36 at the upper edge of the panel. The sheathing 36 is bent around the upper edge of the panel as shown at 37 in Fig. 10A. Projections 38 are formed at the ends of the sheathing, for entry into the slots 27. It will be understood that the end panel 33 may be substituted for those shown at 23 without any change in the remainder of the crate.

The crate illustrated in Figs. 11 through 14 is similar in general to that already described but differs therefrom in minor details. This crate is of the general type known in the trade as a "tomato lug." It comprises side panels 40, end panels 41, a bottom 42 and a removable top 43. Binding straps of angle section extend around the ends of the crate and have tongues struck upwardly therefrom which are driven through the thin boards forming the side panels and bottom. The end panels are similar to that shown in Figs. 10 and 10A in that they have a metal sheathing 45 on the upper edge thereof with projections 46 adapted to enter slots 47 in the ends of the straps 44. The sheathing 45, instead of being bent down flat against the inner side of the end panel as at 37 in Fig. 10A, is formed into a roll or semi-cylindrical shape as indicated at 48. The purpose of this roll is to hold the top layer of the articles packed in the crate while the top is being applied. In packing tomatoes, for example, they are rolled under the tubular projecting portion 48 of the sheathing which serves as a temporary retainer for the top layer. The top 43 comprises a plurality of slats with cross straps 49 adjacent the ends thereof having their edges flanged downwardly. The straps 49 are slotted to receive tongues 50 integral with the sheathing 45 which, when bent downwardly as shown in Figs. 12 and 14, securely hold the top on the crate. Stacking cleats 51 are secured to the top crosswise thereof at each end. These cleats permit the crates to be safely stacked even though the tops may be sprung upwardly as indicated at 52 by the contents of the crate.

It will be apparent from the foregoing description that the invention provides a shipping crate having numerous advantages over such articles as produced heretofore. The crate of my invention may be manufactured at low cost and has ample strength and rigidity to withstand the uses to which it is ordinarily subject. A further advantage is the possibility of easily opening the crate for inspection by a purchaser and the facility with which the crate can be re-closed for final delivery. Considerable economy in the cost of the crate is effected by using for the binding straps 19, metal of such thin gauge that tongues struck up therefrom could not be satisfactorily driven through the panels forming the crate. At the same time, the reinforcing straps strengthen the corners of the crate and render it quite rigid. The location of the cross rails facilitates manual handling of the crate when packed and closed. These rails also provide firm support for the crate when stood on end.

The modified form of crate is especially suited for certain kinds of vegetables such as tomatoes and provides a light, inexpensive carrier which, at the same time, has sufficient strength and rigidity to serve its intended use.

Although I have illustrated and described but a few possible forms of the invention, it will be recognized that changes in the details and construction thereof may be made without departing from the spirit of the invention or the scope of the appended claims.

I claim:

1. In a shipping crate, side and end panels, a top and a bottom, the ends of the top and bottom extending beyond the end panels and the ends of the sides, flat binding straps extending across the bottom adjacent the ends thereof with their edges on opposite sides of the end panels, said straps also extending upwardly along the side panels, the portions of said straps extending upwardly along said side panels having their outer edges flanged over the end panels, reinforcing straps of angle section overlying said flanged portions, and cross straps on the end panels, there being slots in the reinforcing straps, there being slots in the underlying portions of the binding straps registering with the slots in the reinforcing straps, the ends of cross straps extending through said slots and bent over the edges of the slots to draw the side panels against the edges of the end panels and lock the end panels against movement in all directions.

2. In a shipping crate, side and end panels, a top and a bottom, the ends of the top and bottom extending beyond the end panels and the ends of the sides, flat binding straps extending around the greater part of the perimeter of the crate near the ends thereof, said straps having portions extending upwardly along said side panels, those parts of said straps extending across the bottom being substantially flat and having their edges lying on opposite sides of the adjacent end panel, the edges of said strap portions extending upwardly along said side panels being flanged over the edges of the end panels, reinforcing straps of angle section and thicker than said first-mentioned straps, overlying said flanged portions, and cross straps on the end panels, there being slots in the reinforcing straps, there being slots in the underlying portions of the binding straps registering with the slots in the reinforcing straps, the ends of cross straps extending through said slots and bent over the edges of the slots to draw the side panels against the edges of the end panels and lock the end panels against movement in all directions.

3. In a shipping crate, side and end panels, a top and a bottom, the ends of the top and bottom extending beyond the end panels and the ends of the sides, cross rails secured to the overhanging ends of the top and bottom, binding straps extending across the bottom and a portion of the top adjacent the ends thereof, the edges of the straps lying on opposite sides of the end panels, said straps also extending upwardly along the side panels, means securing the outer edges of the binding straps to the top and the cross rails, the portions of said straps extending upwardly along said side panels having their outer edges flanged over the edges of the end panels, reinforcing straps of angle section overlying said flanged portions, and cross straps on the end panels, there being slots in the reinforcing straps, there being slots in the underlying portions of the binding straps registering with the slots in the reinforcing straps, the ends of cross straps extending through said slots and bent over the edges of the slots to draw the side panels against the edges of the end panels and lock the end panels against movement in all directions.

4. In a shipping crate, side and end panels, a top and a bottom, binding straps extending across the bottom adjacent the ends thereof and upwardly along the side panels, the edges of the straps lying on opposite sides of the end panels, reinforcing straps secured to the ends of the side panels and overlying the portions of the first-mentioned straps which extend upwardly along the side panels, a channel-section strap fitting around the upper edge of the end panels and having locking tongues extending through slots in said first-mentioned straps and said reinforcing straps and bent over the edges of the slots to draw the sides of the side panels against the edges of the end panels and lock the end panels against movement in all directions and retain the side panels in position against the end panels.

5. In a shipping crate, side and end panels, a top and a bottom, flat binding straps extending across the bottom adjacent the ends thereof with their edges on opposite sides of the end panels, said straps also extending upwardly along the side panels, the portions of said straps extending upwardly along said side panels having their outer edges flanged over the edges of the end panels, a strap extending across the upper edge of each end panel and bent around said upper edge, said last-mentioned strap having locking tongues extending through slots in said first-mentioned strap and bent over the edges of the slots to draw the side panels against the edges of the end panels and lock the end panels against movement in all directions.

6. In a shipping crate, side and end panels, a top and a bottom, the ends of the top and bottom extending beyond the end panels and the ends of the sides, and binding straps extending around the greater part of the circumference of the crate near the ends thereof, said straps having portions extending upwardly along said side panels, those parts of said strap extending across the top and bottom being substantially flat and having their edges on opposite sides of the adjacent end panel, the edges of said portions extending upwardly along said side panels being flanged over the edges of the end panels and cross straps on the end panels, there being slots in the binding straps, the ends of cross straps extending through said slots and bent over the edges of the slots to draw the side panels against the edges of the end panels and lock the end panels against movement in all directions.

THOMAS M. VAUGHAN.